(12) United States Patent
Weissman et al.

(10) Patent No.: US 11,469,831 B2
(45) Date of Patent: Oct. 11, 2022

(54) TRANSCEIVER CALIBRATIONS AT SILENT PERIODS

(71) Applicant: QUALCOMM Incorporated, San Diego, CA (US)

(72) Inventors: Haim Mendel Weissman, Haifa (IL); Michael Levitsky, Rehovot (IL); Alexander Vladimir Sverdlov, Rehovot (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 99 days.

(21) Appl. No.: 16/577,184

(22) Filed: Sep. 20, 2019

(65) Prior Publication Data

US 2021/0091864 A1 Mar. 25, 2021

(51) Int. Cl.
| | |
|---|---|
| H04B 17/21 | (2015.01) |
| H04W 4/44 | (2018.01) |
| H04W 4/70 | (2018.01) |
| H04L 27/36 | (2006.01) |
| H04W 24/10 | (2009.01) |
| H04W 52/52 | (2009.01) |

(52) U.S. Cl.
CPC .......... *H04B 17/21* (2015.01); *H04L 27/364* (2013.01); *H04W 4/44* (2018.02); *H04W 4/70* (2018.02); *H04W 24/10* (2013.01); *H04W 52/52* (2013.01)

(58) Field of Classification Search
CPC ......... H04B 17/21; H04B 17/14; H04W 4/44; H04W 4/70; H04W 24/10; H04W 52/52; H04W 52/0216; H04L 27/364
See application file for complete search history.

(56) References Cited

U.S. PATENT DOCUMENTS

| | | | |
|---|---|---|---|
| 10,439,743 B2* | 10/2019 | Tercero Vargas ... | H04W 72/085 |
| 10,869,276 B1* | 12/2020 | Lekutai .............. | H04W 52/0261 |
| 11,228,880 B2* | 1/2022 | Aldana ................ | H04W 36/08 |
| 2015/0131543 A1 | 5/2015 | Huo et al. | |
| 2018/0183390 A1* | 6/2018 | Benjamin ................ | H03F 1/32 |
| 2019/0281603 A1 | 9/2019 | Oh et al. | |
| 2019/0313271 A1* | 10/2019 | Yiu ...................... | H04W 72/04 |

(Continued)

OTHER PUBLICATIONS

Intel Corporation: "Further Consideration on PA Calibration Gap", 3GPP TSG-RAN WG4 Meeting #86bis, 3GPP Draft; R4-1804161_ Further Consideration on PA Calibration Gap, 3rd Generation Partnership Project (3GPP), Mobile Competence Centre; 650, Route Des Lucioles; F-06921 Sophia-Antipolis Cedex; France, vol. RAN WG4, No. Melbourne, Australia; Apr. 16, 2018-Apr. 20, 2018, Apr. 15, 2018, pp. 1-4, XP051431062, Retrieved from the Internet: URL: http://www.3gpp.org/ftp/Meetings%5F3GPP%5FSYNC/RAN4/ Docs/ [retrieved on Apr. 15, 2018] section 2.2.

(Continued)

*Primary Examiner* — Brian T O Connor

(74) *Attorney, Agent, or Firm* — Procopio, Cory, Hargreaves & Savitch LLP

(57) ABSTRACT

The apparatus operates communicates with a second wireless device during an active period and performs a radio impairment calibration during a periodic silent period. The calibration may include a receiver calibration, e.g., including gain state training. The calibration may comprise a transmitter calibration.

66 Claims, 11 Drawing Sheets

(56) References Cited

U.S. PATENT DOCUMENTS

2020/0229171 A1* 7/2020 Khoryaev ............. H04W 72/08
2020/0351633 A1* 11/2020 Hoglund ............. G06F 9/45558
2020/0374656 A1* 11/2020 Alawieh ............... G01S 5/0268

OTHER PUBLICATIONS

International Search Report and Written Opinion—PCT/US2020/049050—ISA/EPO—dated Dec. 9, 2020.
Qualcomm Incorporated: "Calibration Gap Configuration", 3GPP TSG-RAN WG4 Meeting #87, 3GPP Draft R4-1807881 PA Cal Gaps, 3rd Generation Partnership Project (3GPP), Mobile Competence Centre; 650, Route Des Lucioles; F-06921 Sophia-Antipolis Cedex; France, vol. RAN WG4, No. Busan, KR; May 21, 2018-May 25, 2018, May 20, 2018 (May 20, 2018), 3 Pages, XP051447414, Retrieved from the Internet: URL: http://www.3gpp.org/ftp/Meetings%5F3GPP%5FSYNC/RAN4/Docs/ [retrieved on May 20, 2018] p. 1, line 11-line 24, p. 2, line 1-line 12.
Cristian Andriesei, "Study of Active Filters Topologies for Telecommunications" ETIS UMR 8051 Laboratory, Ecole Nationae Superieure de l'EIectronique et de ses Applications, Cergy Pontoise University & Centre National de la Recherche Scientifique, France, Dec. 2, 2010, pp. 1-173.
3GPP TS 36.101 v15.4.0: "3rd Generation Partnership Project, Technical Specification Group Radio Access Network Release 15" 3GPP Draft, TS 36.101 v15.4.0, Sep. 2018, pp. 30-290; pp. 279-280 (section 6.3.5.1.1) and p. 286 (section 6.3.5G.1).

* cited by examiner

TRANSCEIVER CALIBRATIONS AT SILENT PERIODS

INTRODUCTION

The present disclosure relates generally to communication systems, and more particularly, to vehicle-to-vehicle (V2V), vehicle-to-everything (V2X), or other device-to-device (D2D) communication.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. Aspects of wireless communication may comprise direct communication between devices, such as in V2X, V2V, and/or other D2D communication. The improvements presented herein may be applicable to V2X, V2V, and/or other D2D technology as well as to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, method is provided for wireless communication at a first wireless device. The method includes communicating with a second wireless device during an active period, and performing a radio impairment calibration during a periodic silent period.

In another aspect of the disclosure, an apparatus is provided for wireless communication at a first wireless device. The apparatus communicates with a second wireless device during an active period. The apparatus performs a radio impairment calibration during the periodic silent period.

In another aspect of the disclosure, an apparatus for wireless communication at a first wireless device is provided. The apparatus includes means for communicating with a second wireless device during an active period and means for performing a radio impairment calibration during a periodic silent period.

In another aspect of the disclosure, a computer-readable medium storing computer executable code for wireless communication at a first wireless device is provided. The code when executed by a processor cause the processor to communicate with a second wireless device during an active period and perform a radio impairment calibration during a periodic silent period.

In another aspect of the disclosure, the periodic silent period comprises at least one symbol of a subframe. In another aspect of the disclosure, the periodic silent period may comprise a last symbol of a subframe. In another aspect of the disclosure, the first wireless device communicates with the second wireless device may be based on at least one of V2X, V2V, or other D2D communication. In another aspect of the disclosure, the radio impairment calibration may comprise at least one of direct current (DC) offset calibration or a an in-phase quadrature (IQ) imbalance calibration. In another aspect of the disclosure, the first wireless device may select a gain state to be calibrated, perform a measurement for the selected gain state during the periodic silent period, and update a DC measurement for the selected gain state. In another aspect of the disclosure the first wireless device may select an untrained gain state or an older gain state having an older measurement than another gain state. In another aspect of the disclosure, the first wireless device may determine whether the measurement comprises a signal power above a threshold, wherein the DC measurement for the selected gain state is updated when the signal power is not above the threshold and discard the measurement when the measurement comprises the signal power above the threshold. In another aspect of the disclosure the first wireless device may transmit during the active period, and may switch from a transmission mode to a reception mode in order to perform the radio impairment calibration during the periodic silent period. In another aspect of the disclosure the first wireless device may transmit during the active mode, and may transmit a transmission below a transmission power level threshold during the periodic silent period and use a receiver of the first wireless device to measure the transmission as part of performing the radio impairment calibration. In another aspect of the disclosure the radio impairment calibration may comprise a loopback calibration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
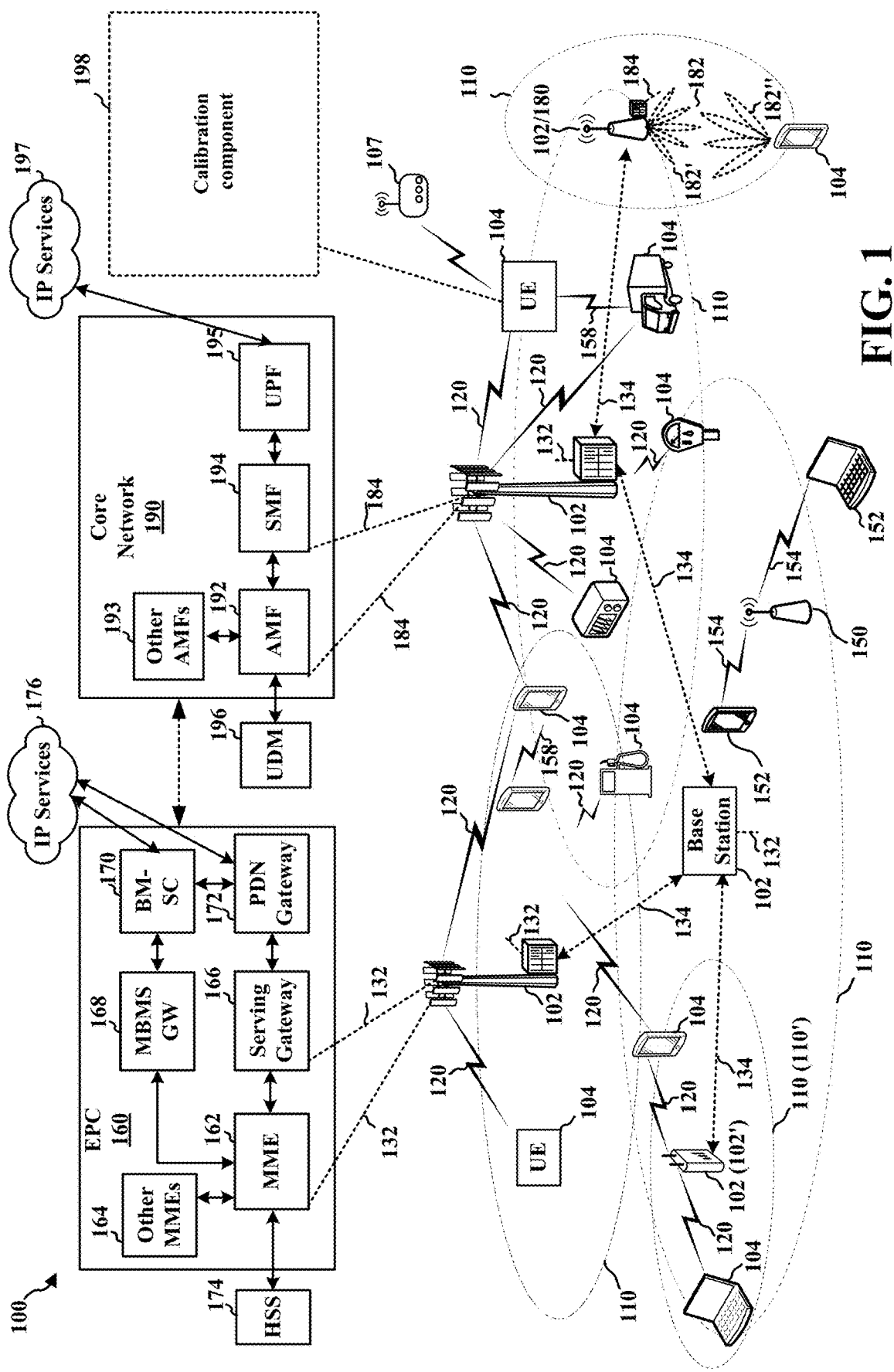
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects presented herein enable a wireless device to perform transceiver calibrations during a silent period. Such calibration may improve communication for devices that communicate in a burst mode, e.g., in which there may not be continuous loops operating at a receiver and/or transmitter. Calibrations may be performed for a receiver and/or for a receiver. For example, a receiver may select an untrained gain state and/or an older measurement based on a gain state for performing the calibration. Such selections may help the wireless device to maintain more accurate calibration information, that can be applied, as needed during an active period. As one example, V2X communication, such as CV2X communication, may vary from one subframe to another with different frequency allocations and received signal power. Such communication may involve a low duty cycle with infrequent transmissions. The calibration performed during a silent period may improve communication for such a device during an active period.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more base stations 102 (such as macro base stations). A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network. A base station 102, whether a small cell 102' or a large cell (e.g., macro base station), may include an eNB, gNodeB (gNB), or other type of base station. Some base stations 180, such as a gNB, may operate in a traditional sub 6 GHz spectrum, in millimeter wave (mmW) frequencies, and/or near mmW frequencies in communication with the UE 104. When the gNB operates in mmW or near mmW frequencies, the gNB may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station (e.g., base station 180) may utilise beamforming 182 with the UE 104 to compensate for the extremely high path loss and short range.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or RSU 107 to communicate with another UE 104 or RSU 107, such as based on V2X, V2V, or other D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Some wireless communication networks may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), and/or a combination thereof and/or with other devices, which can be collectively referred to as vehicle-to-anything (V2X) communications. V2X communication may comprise, e.g., cellular V2X (CV2X) communication. Referring again to FIG. 1, in certain aspects, a UE 104, e.g., a transmitting Vehicle User Equipment (VUE) or other UE, may be configured to transmit messages directly to another UE 104. The communication may be based on V2V/V2X/V2I or other D2D communication, such as Proximity Services (ProSe), etc. Communication based on V2V, V2X, V2I, and/or other D2D may also be transmitted and received by other transmitting and receiving devices, such as Road Side Unit (RSU) 107, etc. Aspects of the communication may be based on PC5 or sidelink communication e.g., as described in connection with the example in FIG. 2. Although the following description may provide examples for V2X/D2D communication in connection with 5G NR, the concepts described herein may be applicable to other similar areas, such as LTE, LTE-A, CDMA, GSM, and other wireless technologies.

Referring again to FIG. 1, in certain aspects, wireless devices may include a calibration component 198 configured to perform a radio impairment calibration during a periodic silent period. For example, a UE 104 may comprise the calibration component. Although described in connection with a UE, a RSU 107, or other wireless device communicating based on V2X, V2V, and/or other D2D may comprise a calibration component 198. The calibration component may be configured to perform aspects described in connection with at least FIGS. 9 and 10.

Figure 2:
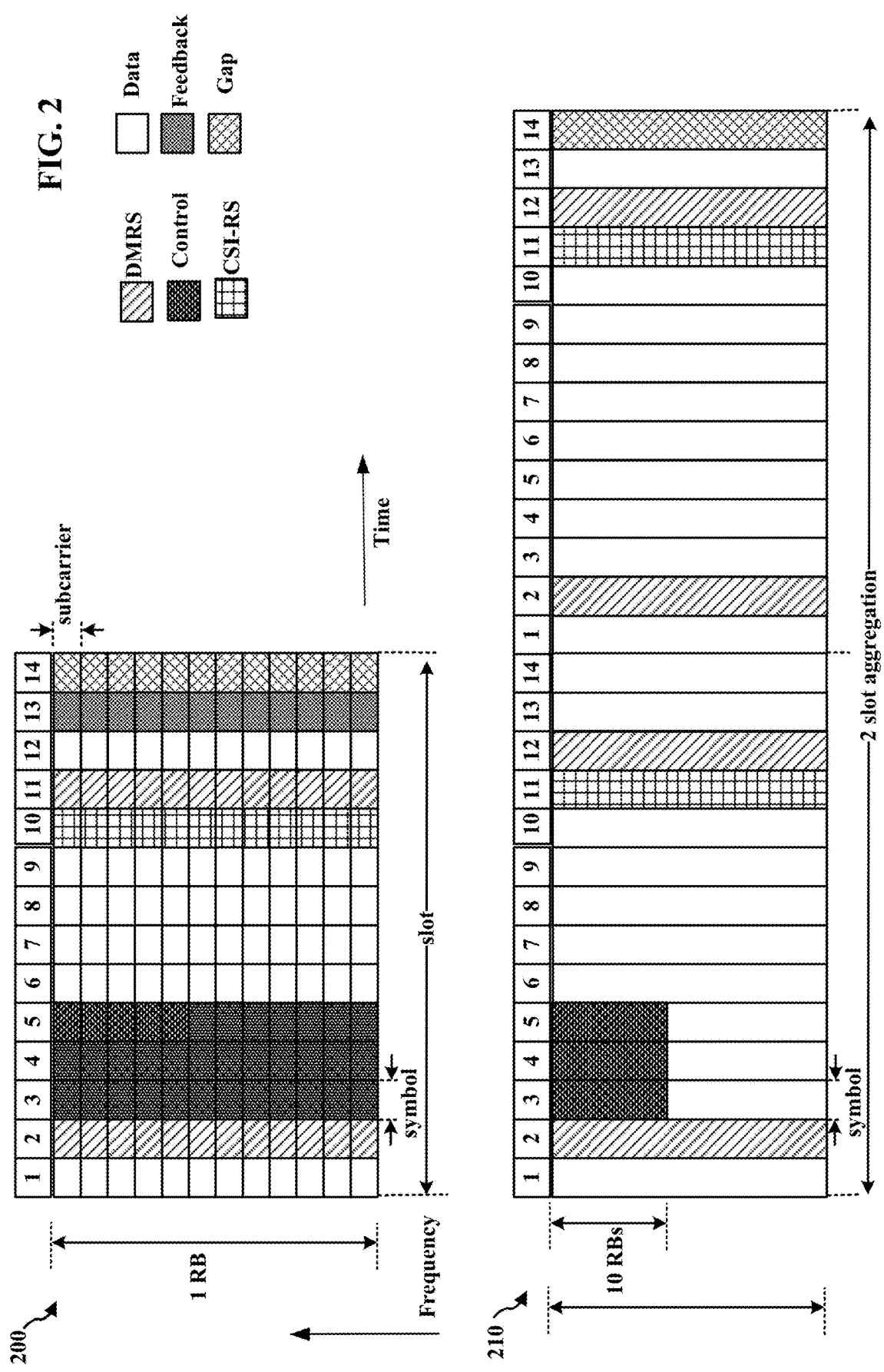
FIG. 2 illustrates example aspects of a sidelink slot structure.

FIG. 2 illustrates example diagram 200 and example diagram 210 showing examples slot structures that may be used for wireless communication between UE 104 and UE 104', e.g., for sidelink communication. The slot structure may be within a 4G or 5G/NR frame structure. Although the following description may be focused on 4G, the concepts described herein may be applicable to other similar areas, such as 5G/NR, LTE, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single slot transmission, e.g., which may correspond to a 0.5 ms transmission time interval (TTI). Diagram 210 illustrates an example two-slot aggregation, e.g., an aggregation of two 0.5 ms TTIs. Diagram 200 illustrates a single RB, whereas diagram 210 illustrates N RBs. In diagram 210, 10 RBs being used for control is merely one example. The number of RBs may differ.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information, e.g., along with demodulation RS (DMRS). FIG. 2 also illustrates that symbol(s) may comprise CSI-RS. The symbols in FIG. 2 that are indicated for DMRS or CSI-RS indicate that the symbol comprises DMRS or CSI-RS REs. Such symbols may also comprise REs that include data. For example, if a number of ports for DMRS or CSI-RS is 1 and a comb-2 pattern is used for DMRS/CSI-RS, then half of the REs may comprise the RS and the other half of the REs may comprise data. A CSI-RS resource may start at any symbol of a slot, and may occupy 1, 2, or 4 symbols depending on a configured number of ports. CSI-RS can be periodic, semi-persistent, or aperiodic (e.g., based on DCI triggering). For time/frequency tracking, CSI-RS may be either periodic or aperiodic. CSI-RS may be transmitted in busts of two or four symbols that are spread across one or two slots. The control information may comprise Sidelink Control Information (SCI). At least one symbol may be used for feedback, as described herein. A symbol prior to and/or after the feedback may be used for turnaround between reception of data and transmission of the feedback. Although symbol 12 is illustrated for data, it may instead be a gap symbol to enable turnaround for feedback in symbol 13. Another symbol, e.g., at the end of the slot may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 2. Multiple slots may be aggregated together. FIG. 2 also illustrates an example aggregation of two slot. The aggregated number of slots may also be larger than two. When slots are aggregated, the symbols used for feedback and/or a gap symbol may be different that for a single slot. While feedback is not illustrated for the aggregated example, symbol(s) in a multiple slot aggregation may also be allocated for feedback, as illustrated in the one slot example.

Figure 3:
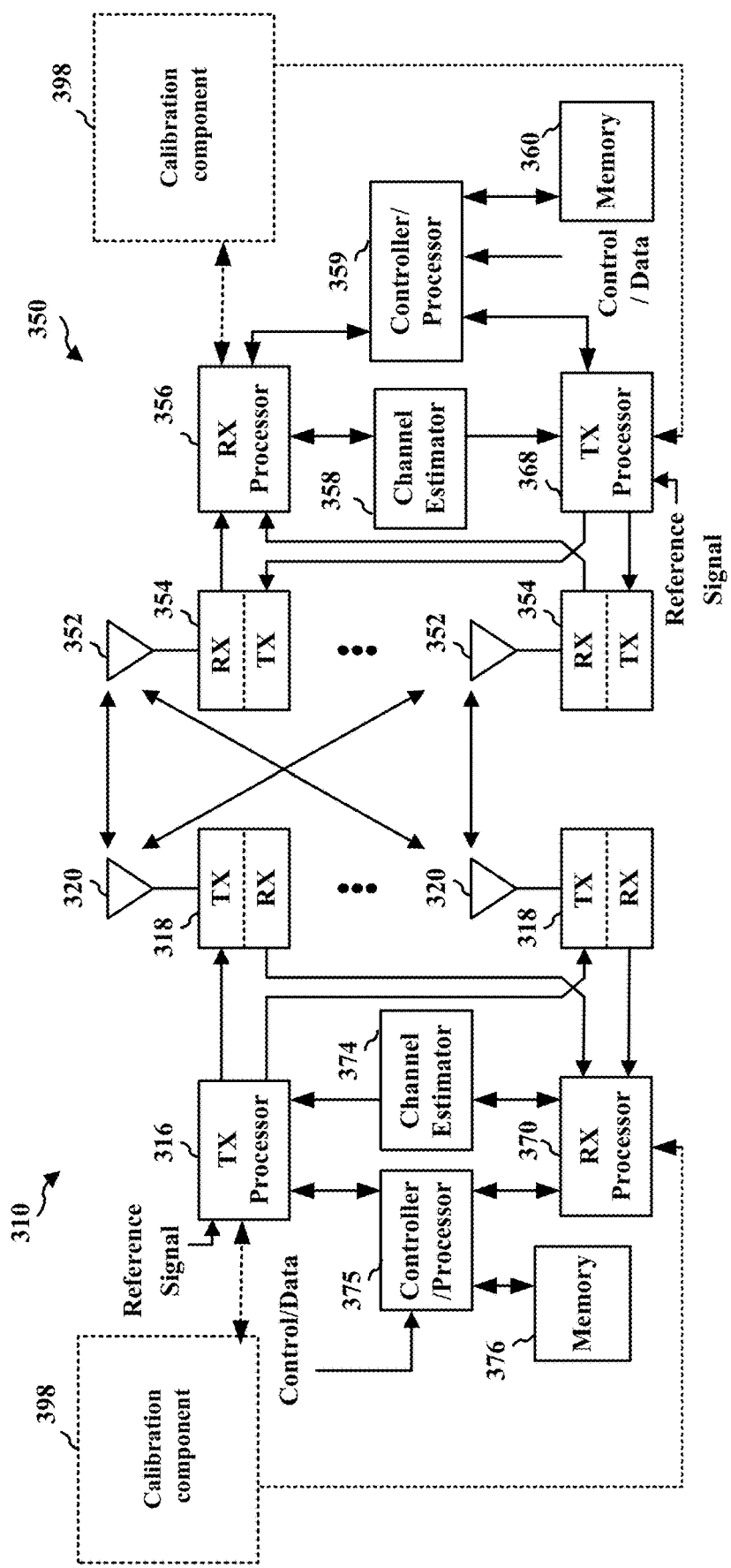
FIG. 3 is a diagram illustrating an example of a first device and a second device involved in wireless communication.

FIG. 3 is a block diagram of a first wireless communication device 310 in communication with a second wireless communication device 350, e.g., via V2V/V2X/D2D communication. The device 310 may comprise a transmitting device communicating with a receiving device, e.g., device 350, via V2V/V2X/D2D communication. The communication may be based, e.g., on sidelink. The transmitting device, e.g., device 310, may comprise a UE, an RSU, etc. The receiving device may comprise a UE, an RSU, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, or the controller/processor 359 of device 350 or the TX processor 316, the RX processor 370, or the controller/processor 375 may be configured to perform aspects described in connection with 198 of FIG. 1, that may be configured to perform a radio impairment calibration during a periodic silent period.

Figure 4:
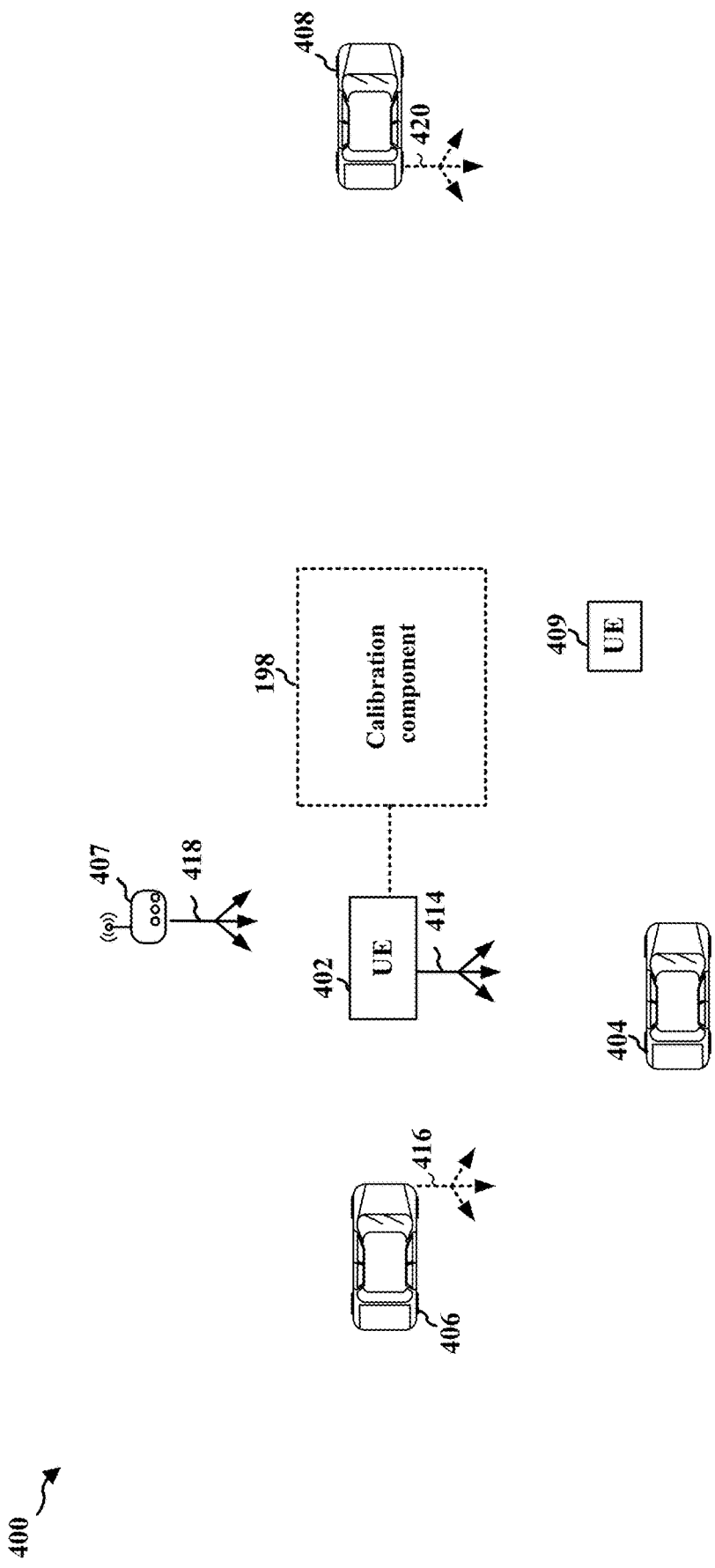
FIG. 4 illustrates an example of devices in wireless communication based, e.g., on V2V, V2X, and/or other D2D communication.

FIG. 4 illustrates an example 400 of wireless communication between devices based on V2X/V2V/D2D communication. The communication may be based on a slot structure comprising aspects described in connection with FIG. 2. For example, transmitting UE 402 may transmit a transmission 414, e.g., comprising a control channel and/or a corresponding data channel, that may be received by receiving UEs 404, 406, 408, 409. A control channel may include information for decoding a data channel and may also be used by receiving device to avoid interference by refraining from transmitting on the occupied resources during a data transmission. The number of TTIs, as well as the RBs that will be occupied by the data transmission, may be indicated in a control message from the transmitting device. The UEs 402, 404, 406, 408, 409 may each be capable of operating as a transmitting device in addition to operating as a receiving device. Thus, UEs 406, 408 are illustrated as transmitting a transmissions 416, 420. The transmissions 414, 416, 420 may be broadcast or multicast to nearby devices. For example, UE 402 may transmit communication intended for receipt by other UEs within a range 401 of UE 402. Additionally/alternatively, RSU 407 may receive communication from and/or transmit communication to UEs 402, 404, 406, 408, 409.

Any of UE 402, 404, 406, 408, 409 or RSU 407 may comprise a calibration component, similar to 198 described in connection with FIG. 1.

In some aspects, communication may be exchanged directly between UEs without infrastructure support. Such communication may include V2X (e.g., CV2X), V2V, and/or other D2D communication. As described in connection with FIG. 4, UEs may transmit and receive direct communication and control, e.g., on PC5. Thus, such communication may be self-managed by the UEs without network assistance. As an example, CV2X mode-4 may involve operation without infrastructure support. UEs involved in such communication may use a resource pool allocated for the communication. Semi persistent scheduling (SPS) may be used to select and/or reserve resources for transmission by a UE. Control information, such as sidelink control information, may be transmitted over PSCCH. Data, e.g., sidelink data, may be transmitted over a PSSCH. A V2X signal may vary between subframes, e.g., based on different frequency allocations and different received signal powers for different subframes. For example, a V2X signal may vary in a random manner, and changes may occur in each subframe. This may be in contrast to other types of communication, such as LTE, that may have a more stable signal over time. Additionally, a V2X transceiver may transmit using a low duty cycle, e.g., a duty cycle of less than 3% or of approximately 2%. The V2X transceiver may transmit only once per 100 ms, 200 ms, 300 ms, etc.

In order to properly receive a signal, radio impairment calibrations may be performed for the receiver. A transmission signal may be transmitted in a burst mode by each UE communicating based on V2X V2V, or other D2D communication. As one example, a vehicle may transmit communication in a burst mode, and the receiving device (e.g., receiving UE, vehicle, RSU, etc.) may similarly operate in a burst mode to receive the communication. Thus, there might not be a continuous loop operating, e.g., on a subframe basis, on the receiver side of a UE. As an example, V2X communication may employ fast automatic gain control (AGC) to adjust a gain at a beginning of each subframe in less than one symbol of time.

Direct current (DC) tracking performed at the receiver may be dependent on the receiver's gain. DC tracking may be performed per the receiver's gain state, e.g., once the gain is settled. A reading of a DC tracking loop can be taken per subframe, e.g., at an end of a subframe.

The receiver may perform calibration for DC, a an in-phase quadrature (IQ) imbalance calibration, etc. The calibration may be performed per subframe for a relevant AGC gain state (GS) that is being used by the receiver. When the receive uses gain states that are not frequently used, the receiver may suffer from a high DC level. The high DC level may occur to due DC drift, for example, as a result of temperature changes. A similar effect may occur for an IQ imbalance or timing skew. If a calibration is not performed within a certain period, the calibration parameters may become outdated. DC removal on a relevant allocation of resources may impact parameters used in the receiver calibration. As an example, the DC removal may affect the AGC decision. Thus, removal of an inaccurate DC may lead to selection of an incorrect gain state, which may degrade the sensitivity of the receiver and lead to a reduced signal-to-noise ratio (SNR). Even if AGC selection is proper, the removal of an inaccurate DC may impact SNR determination at specific gain states. Thus, removal of an inaccurate DC may lead to a reduced SNR even if a proper gain state is selected.

If the DC estimation is done in presence of a strong signal that has allocations at the DC range, the DC estimation may be impacted and corrupted. Therefore it may be helpful to validate that the receive signal power is below a predefined threshold. Doing the DC calibration in the silence period, almost eliminates the opportunity of strong signal to appear while doing the calibration, significantly improving the efficiency of the calibration. There may be rare cases in which interfering signal such as a dedicated short range communication (DSRC) signal might be close to a V2X signal and might have some impact on the measurement.

Figure 5:
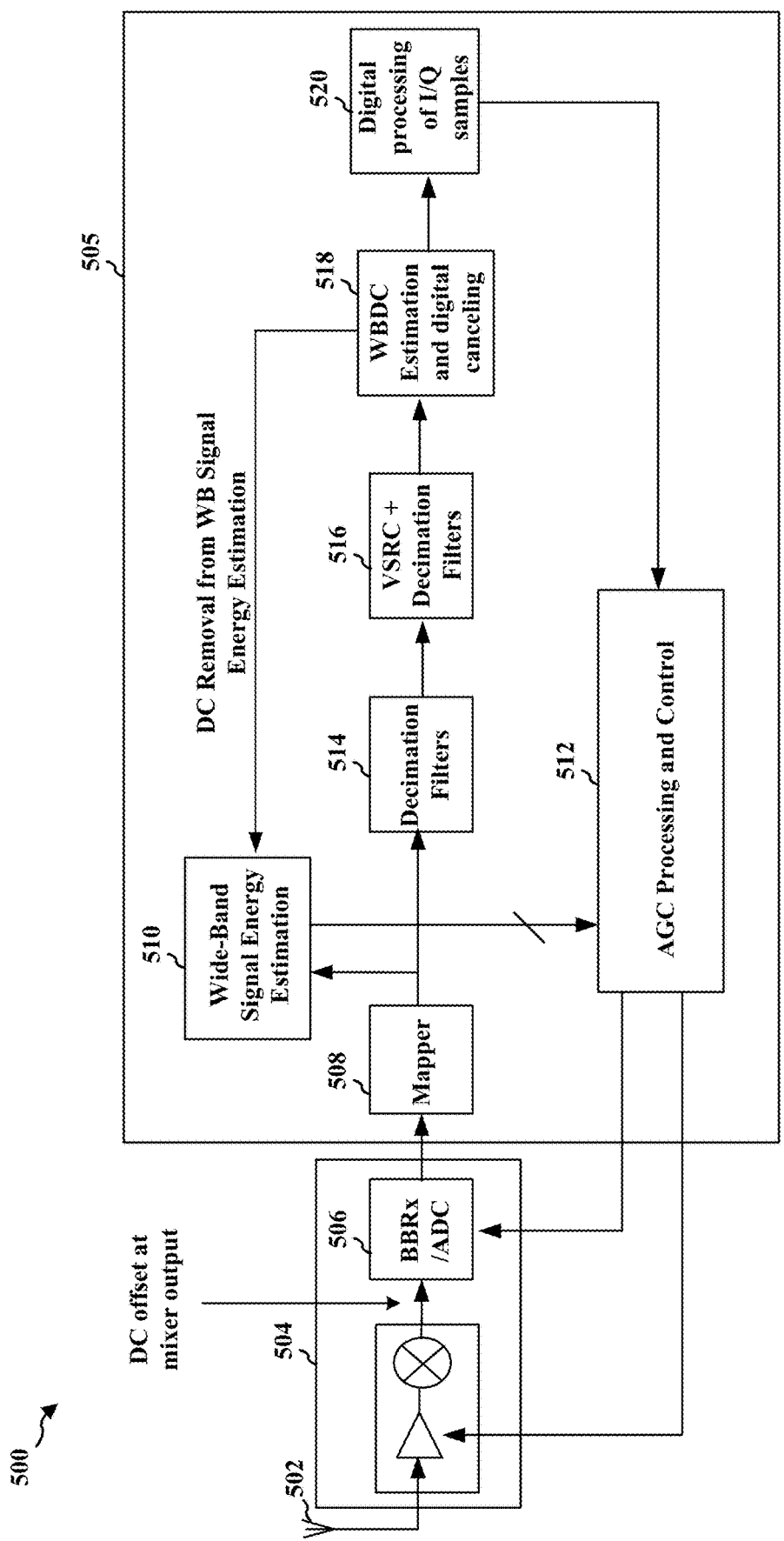
FIG. 5 illustrates example components of a wireless device.

FIG. 5 illustrates an example 500 of automatic gain control for a receiver, e.g., a receiver for V2X communication, V2V communication, sidelink communication, D2D communication etc. FIG. 5 is merely an example, and automatic gain control may be applied using different components and in a different manner. Initially, a fast AGC may be used to adjust the gain at the beginning of each subframe. Fast AGC may refer to AGC that is performed in less than one symbol of time. The AGC may begin by using an initial gain setting and may select a final gain setting to converge upon a wide-band signal energy estimation. The AGC decision of the gain setting for convergence may be based on the wide-band signal energy estimation.

For example, as illustrated in FIG. 5, a signal may be received by a receiver 504 (or transceiver) via an antenna 502. The gain may be applied to each of the components of the receiver 504. The receiver may include one or more LNAs. The receiver 504 may include a baseband receiver (BBRx) and/or analog to digital converter (ADC) component 506. The ADC component 506 may output unsigned data. A processing component 505 may include a mapper 508 that receives the unsigned data from the ADC component 506 and may convert the format from an unsigned format to a signed format. Following processing at the mapper 508, a wide band signal energy estimation component 510 may generate an estimate of the wide band signal energy. The estimate of the wideband signal energy may be provided to an AGC processing and control component 512. The AGC processing and control component 512 may select an AGC gain state to apply, e.g., at the receiver 504. The signal may be processed by various filters, e.g., any of decimation filter(s) 514, a variable sample rate converter (VSRC) and decimation filter 516, etc. After filtering, component 518 may perform a DC offset estimation and/or digital canceling. For example, the component 518 may estimate DC in the received signal. The estimation may be provided to wide band signal energy estimation component 510 for use in estimating the wideband signal energy, e.g., after canceling or otherwise removing the estimated DC from the signal. Thus, the estimate of the wideband signal energy used to select the AGC gain state to apply at the receiver may have the DC canceled based on a DC estimation. Additional processing of the signal may be provided, e.g., by component 520. As the DC offset generated at a receiver mixer output may be subtracted from the wideband signal energy estimation for selecting the gain, a more accurate DC estimation may improve selection and application of a gain state. The DC offset estimation and cancellation for the active receiver AGC gain states affects the AGC decisions, the receiver sensitivity, and SNR. The DC offset estimation may be impacted by the presence of a wideband signal.

Figure 6:
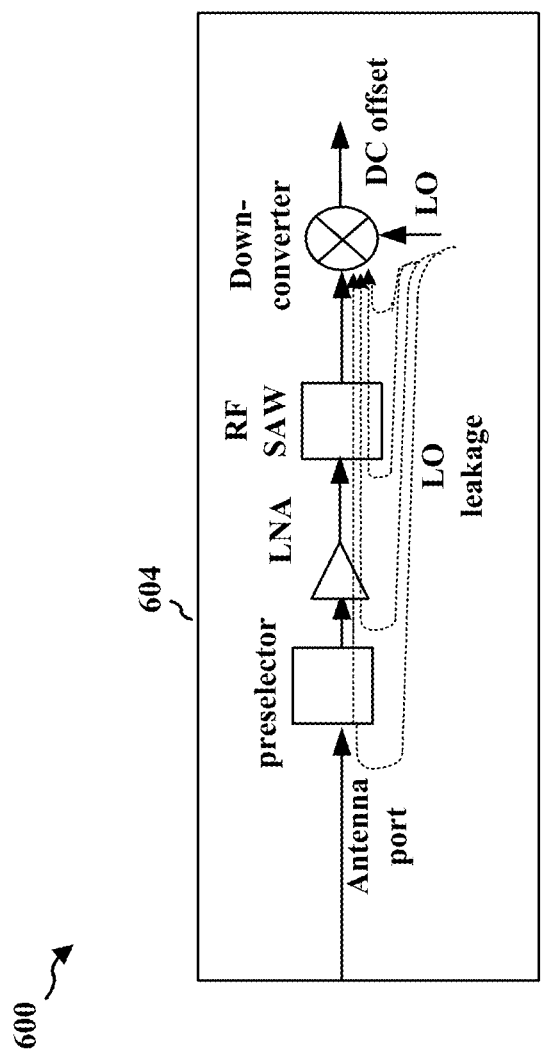
FIG. 6 illustrates example components of a wireless device.

FIG. 6 illustrates an example 600 of components of a receiver 604 that may experience leaking from a local oscillator (LO). As an example, leakage from a LO that is input to a downconverter may be too high if it is added to the wideband signal energy and if it is not cancelled properly, it may result in a wrong energy estimation of the wideband received signal. Hence, the AGC gain selection might be incorrect.

Aspects presented herein provide for improved RF calibrations. Aspects may be helpful for burst transmissions, which may not have multiple opportunities for performing calibrations of the transmitter gain and output power. Similarly, there may be limited opportunities for loopback calibration. In a loopback mode, a calibration may be performed to adjust for an IQ imbalance or a timing skew. A loopback calibration may include determining LO leakage and estimates of a transmission image (e.g., a transmission image may be a folded baseband converted by the LO aside the signal) that limits the transmitter Error Vector Magnitude (EVM)/SNR. As an example, CV2X output power tolerances may be smaller than output power tolerances of other RATs. For example, Table 1 illustrates an absolute power tolerance under normal and extreme conditions for LTE. Table 2 illustrates an example absolute power tolerance under normal and extreme conditions for VC2X. The smaller output power tolerances increase the benefits of improved calibration for transmitter gain control.

TABLE 1

| LTE | |
| --- | --- |
| Conditions | Tolerance |
| Normal | ±9.0 dB |
| Extreme | ±12.0 dB |

TABLE 2

| CV2X | |
| --- | --- |
| Conditions | Tolerance |
| Normal | ±3.0 dB |
| Extreme | ±6.0 dB |

Aspects presented herein may include using time reserved for a silent period, a blanking mode, and/or a quiet mode to perform calibrations. As an example, a CV2X transceiver may be active over the first thirteen symbols of slot, e.g., symbol 0 to symbol 12. At symbol 13, e.g., at a last symbol of a slot, the CV2X transceiver observes a silent period. Observing the silent period may include operating the transmitter in a blanking mode and not requiring the receiver to operate. The symbol may be a reserved symbol in which each of the devices operating using CV2X observe the silent period and refrain from transmitting. For example, the devices may refrain from transmitting above a defined power level. As the devices refrain from transmitting to other devices during the symbol, the devices do not need to attempt to receive communication during the symbol. The example of a single symbol is merely to illustrate the concept. A silent period may extend for any amount of time. The silent period may correspond to silent symbol(s), silent subframe(s), etc. The silent period may correspond to masked subframe(s) or symbol(s). As well, while CV2X is used to illustrate the concept, aspects may also be applicable to a silent period based on another RAT.

In order to improve calibration, e.g., for burst transmissions, a wireless device may use a silent period, e.g., symbol 13 in CV2X, for performing calibrations. The calibration may include calibrations for untrained gain states. The calibration may include calibration for less frequently trained gain states from among a plurality of gain states. The calibration may include measurement of DC level estimated by the DC tracking loop for each gain state.

By performing the calibration during a silent period, the wireless device may be able to perform calibrations for gain states that have not been used for a relatively long time, e.g., in comparison to when other gain states have been used. Such gain states that were last calibrated at a later point than other gain states may suffer from added DC drift, RSB drift, etc. The use of the silent period to perform the calibrations improves the accuracy of the calibration without impact from received signals that might cause saturation of the receiver or residual calibration errors. The calibration may also be improved by fewer interruptions from other signals.

Figure 7:
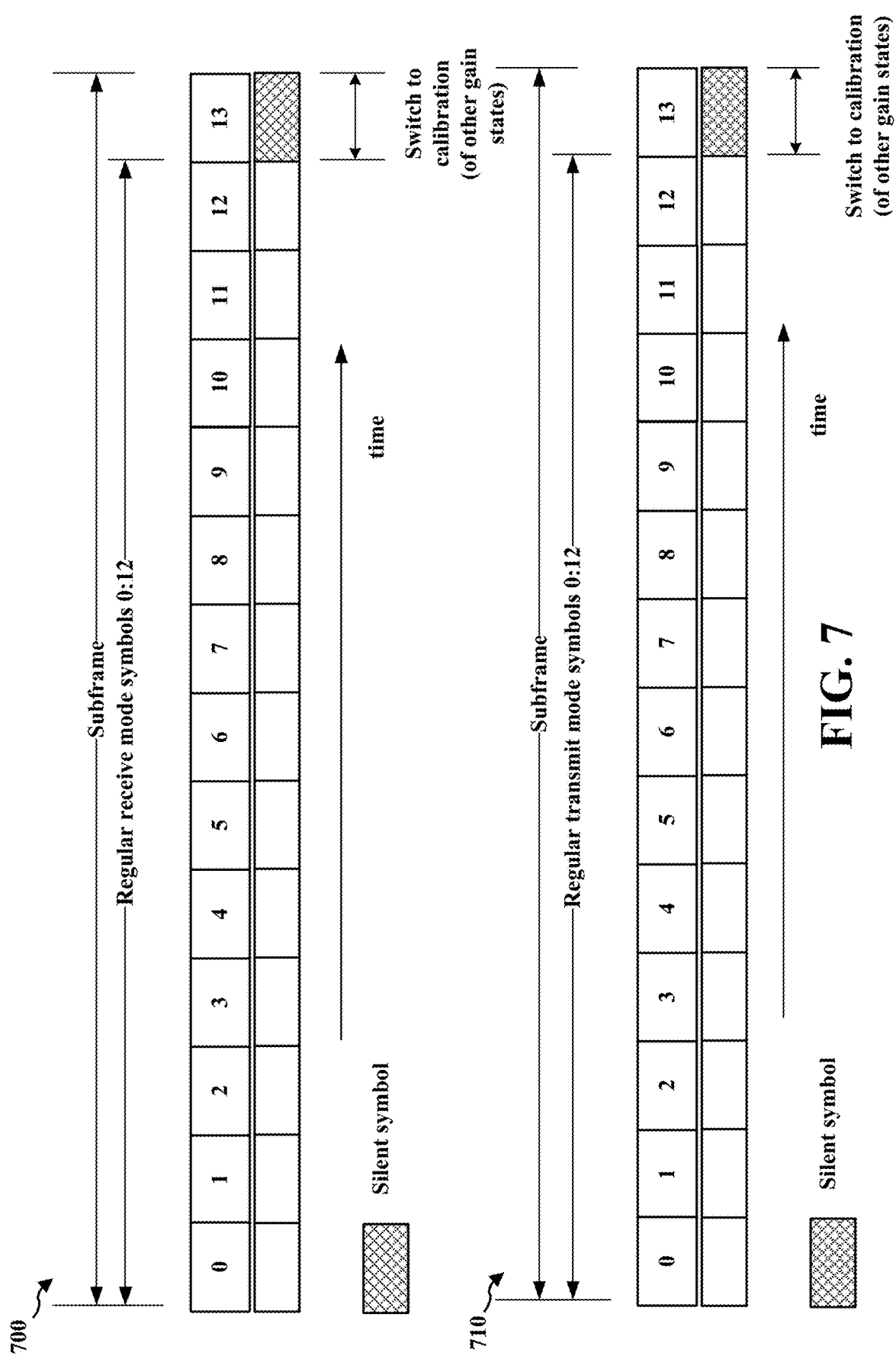
FIG. 7 illustrates examples of an active period and a silent period.

FIG. 7 illustrates an example 700 of a set of symbols for a receiver. The receiver may operate in a normal mode from symbol 0 to symbol 12. Then, at symbol 13, the receiver may observe a silent period. The period during which the receiver operates in such a mode may be referred to as a silent period or a quiet period. As the period in this example is a single symbol, the symbol may be referred to as a silent symbol or a quiet symbol. During symbol 13, the receiver may perform a calibration, e.g., a calibration that is based on any of an in-phase quadrature (IQ) imbalance calibration, DC calibration, a timing skew calibration, a spur calibration, a loopback calibration, etc. A spur calibration may include a calibration for continuous wave spurs and/or other unmodulated spurs. The receiver may perform calibrations each time a silent period occurs. For example, the receiver may perform calibrations in each symbol 13. At each symbol 13, the receiver may choose a gain state that is less trained than the other gain states to be calibrated. For example, in order to perform a DC calibration at symbol 13 for an untrained gain state, e.g., gain state Gi, the receiver may set the receiver gain to gain state Gi during symbol 13 and may perform the DC calibration. As part of the calibration, the receiver may verify that there is not a significant amount of signal power that is received during symbol 13. A significant amount of signal power may correspond to an amount that may impact DC estimation. For example, the receiver may determine whether the received signal power is above a threshold power level. If the received signal power is above a threshold power level, the receiver may discard the measurement. The threshold may depend on the receiver gain state. As an example, if the expected noise power is −43 dBm, then the measurement may be discarded if the received signal power is measured to be higher than −38 dBm during a silent symbol. The threshold may have a difference from the expected noise power that is less than 10 dBm, less than 7 dBm, less than 5 dBm, or even lower. In an example, the threshold level may be application specific. A received signal power above the threshold may indicate a signal from a jammer or a DSRC. If the received signal power is below the threshold, the receiver may update a DC measurement table for the gain state Gi as part of the calibration process. At a next symbol 13, a different untrained gain state may be selected by the receiver for calibration, and a DC measurement for that gain state may be added to the DC measurement table. Thus, the receiver may continually update the DC measurement table by performing DC measurements for gain states that are less trained or that have an older DC measurement.

FIG. 7 also illustrates an example 710 of a set of symbols for a transmitter. A wireless device may operate as a receiver at times and at other times may operate as a transmitter. Thus, the examples 700, 710 may apply to a single wireless device. The transmitter may operate in a normal mode from symbol 0 to symbol 12. Then, at symbol 13, the receiver may observe a silent period, as described in connection with 700. During symbol 13, the wireless device may change from operating as a transmitter to operating as a receiver in order to perform a calibration, e.g., a calibration that is based on any of a DC offset calibration, an IQ imbalance, a timing skew calibration, a spur calibration, a loopback calibration, etc. A spur calibration may include a calibration for continuous wave spurs and/or other unmodulated spurs. The transmitter may change to reception in order to perform calibrations each time a silent period occurs. As described in connection with the receiver example 700, the transmitter may select an untrained gain state, or a gain state with an older DC measurement, and may perform the DC calibration using the selected gain state. After verifying that a received signal power is not above a threshold, the wireless device may update a DC measurement table by adding the DC measurement for the selected gain state as part of the calibration process based on the DC tracking loop reading.

By performing the measurement during a silent period, the accuracy of the calibrations may be improved and can be performed with minimal interruption to incoming signals. By improving the accuracy of the measurements and maintaining a more accurate DC measurement table, the wireless device can improve burst mode communication. By calibrating receiver gains that were not used for a longer amount of time, e.g., for parameters such as DC offset, IQ imbalance, etc., the relevant parameters and calibration tables may be maintained in a more current, accurate manner. Then, when the gains are used in an active receiver, e.g., during symbols 0 to 12, the relevant parameters will be up to date and the receiver is less likely to suffer from performance degradation. The silent period may comprise a silent reception period, e.g., as described in connection with example 700. The silent period may comprise a silent transmission period, e.g., as described below in connection with example 710.

As another example, the wireless may not switch to receiving during symbol 13 and may instead remain in a transmission mode in order to perform transmission calibrations. For example, the wireless device may use the silent period to perform a loopback calibration. For example, the wireless device may use a loopback mode to transmit a signal at a low transmission power and receive the signal using a receiver at the wireless device. The wireless device may use a transmission power that is below a threshold level in order to avoid affecting other wireless devices that are observing the silent period. As an example, the wireless device may transmit using a transmission power below −50 dBm (EIRP at antenna port). Additionally and/or alternatively, the wireless device may perform the transmission during the silent period without exceeding the level allowed by the standard (below −50 dBm). For example, a power amplifier may be in an off state for the transmission. By measuring the signal in a loopback mode without the power amplification, the wireless device may perform the measurement of the transmitted residual side band signal level by the receiver simultaneously with the transmission. The transmission may be performed for calibration, without exceeding a power limit for the silent period. If having the power amplification off is not sufficient, the pre-power amplification transmit section power may be attenuated to allow the power to be below the limit.

Figure 8:
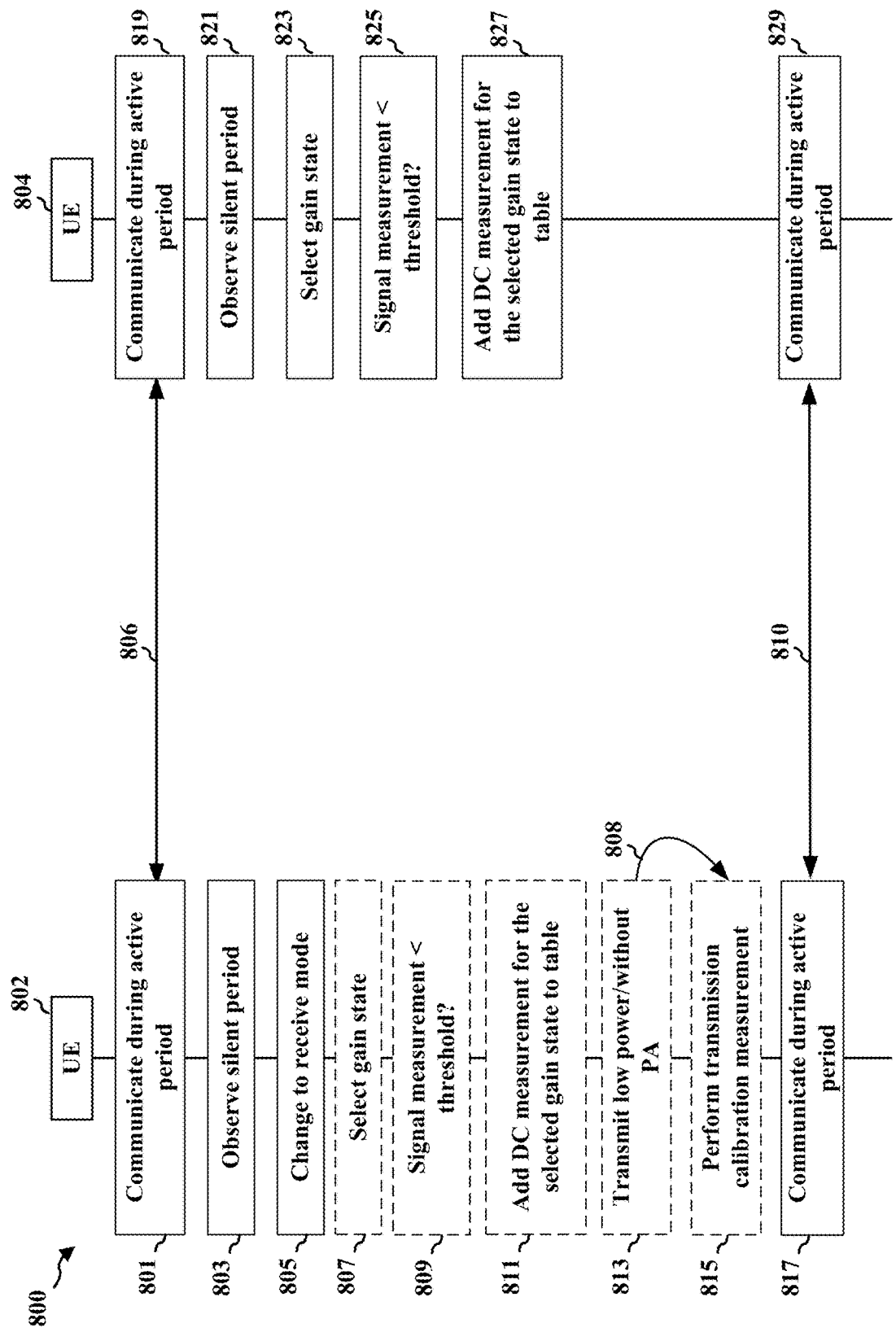
FIG. 8 illustrates an example communication flow between wireless devices.

FIG. 8 illustrates an example communication flow 800 between a first UE 802 and a second UE 804. The communication may be based on V2X communication, V2V communication, other D2D communication, etc., as described in connection with FIG. 4. As one example, the communication may be based on CV2X. UE 802 and UE 804 may both communicate during a first period of time and may observe a silent period. For example, UE 802 may communicate, at 801, as a transmitter by transmitting communication 806 to UE 804. UE 804 may communicate, at 819, by receiving the communication 806 during the first period of time. For example, UE 804 may transmit communication 806 during symbols 0 to 12 of a subframe. At a silent period, e.g. symbol 13, UE 802 may observe a silent period, at 803. Similarly, UE 804 may observe a silent period at 821. During the silent period, UE 802 may refrain from transmitting above a threshold power level, and UE 804 may not be required to receive communication from other UEs. UE 802 may use the silent period to perform receiver calibrations or to perform transmitter calibrations. UE 804 may use the silent period to perform receiver calibrations. For example, UE 802 may change from transmitting to a reception mode, at 805, in order to perform receiver calibrations during the silent period. UE 802 may select a gain state, e.g., that is untrained or having an older measurement, at 807. At 809, UE 802 may determine whether the measured signal power is above a level that may indicate a jammer or DSRC. If the measured signal power is above the level, UE 802 may discard the measurement. Otherwise, at 811, UE 802 may add a DC measurement for the selected gain state to a DC measurement table. The DC measurement table may be used, e.g., when the UE returns to communication during an active period and selects the gain state for which the measurement was performed. Similarly, UE 804 may observe the silent period, at 821; select a gain state, at 823; and perform a calibration measurement. At 825, UE 804 may determine whether the measured signal power is above the level, UE 804 may discard the measurement. Otherwise, at 827, UE 804 may add a DC measurement for the selected gain state to a DC measurement table. UE 802 and UE 804 may return to communicating during an active period, e.g., at 817, 829, respectively. For example, UE 802 and 804 may continue to exchange communication 810 during the active period. The communication may be transmitted by UE 802 and received by UE 804 or may be transmitted by UE 804 and received by UE 802. In the active period, the UEs may apply the updated measurements from the calibration performed during the silent period. As an example, the UEs may return to exchanging communication at symbol 0 following symbol 13. At each symbol 13, the UEs may continue to perform calibration.

During the silent period, UE 802 may perform a transmitter calibration, e.g., rather than the receiver calibration described in connection with 805-811. For example, UE 802 may transmit a signal 808 using a low transmission power, e.g., below a threshold, and without power amplification, at 813. While transmitting the signal 808, the UE 802 may use a receiver to receive the signal 808 and perform transmission calibration measurements, at 815. The calibration measurements may assist in determining a loopback calibration. A loopback calibration may include an IQ imbalance calibration or a timing skew calibration performed while the UE is in a loopback mode. The calibration measurements may be performed in a loopback mode, for example. After performing the calibration measurements, UE 802 may return to communication during an active period, at 817.

Figure 9:
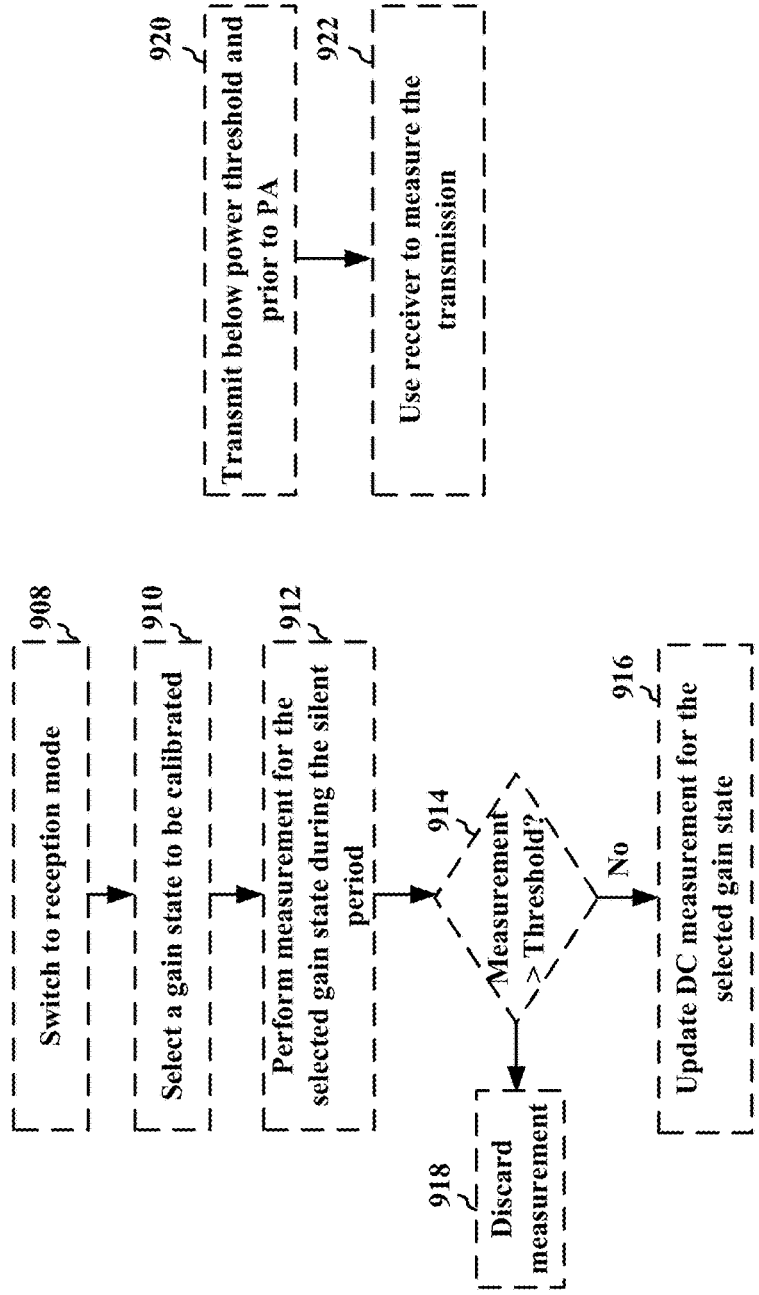
FIG. 9 is a flowchart of a method of wireless communication.

FIG. 9 is a flowchart 900 of a method of wireless communication. The method may be performed by a wireless device or a component of a wireless device (e.g., the UE 104, 402, 404, 406, 408, 802, 804; RSU 107, 407; device 310, 350; the apparatus 1002/1002'; the processing system 1114, which may include memory and which may be an entire wireless device (e.g., an entire UE, RSU, etc.) or a component of a wireless device (e.g., a component of a UE, RSU, etc.). Optional aspects are illustrated with a dashed line. The method improves calibration, and especially calibration for burst mode communication, enabling a device to transmit and receive communication more accurately.

At 902, wireless device communicates with a second wireless device during an active period. The wireless device may communicate with the second wireless device based on at least one of V2X communication, V2V communication, or other D2D communication. In one example, the device may communicate with the second wireless device based on CV2X communication. The communication may be performed, e.g., by the communication component 1008 of apparatus 1002. The communication may include reception of communication from a second wireless device, e.g., the wireless device 1050, via reception component 1004 and/or transmission of communication to the wireless device 1050 via transmission component 1006.

At 904, the wireless device may refrain from transmitting above a threshold transmission power during a silent period and may not be required to receive communication. The periodic silent period may comprise at least one symbol of a subframe. In some examples, the periodic silent period may comprise a last symbol of a subframe. In the example described for CV2X, the silent period may comprise symbol 13, and the active period may correspond to symbol 0 to symbol 12. In other examples, the silent period may correspond to a different amount of time that is observed by wireless devices. For example, the communication component 1008 of the apparatus 1002 may refrain from transmitting above the threshold transmission power during the silent period.

At 906, the wireless device performs a radio impairment calibration during the periodic silent period. A radio impairment calibration corresponds to a process for identifying signal components that are not a part of the intended transmission signal. The unintended signal components may be introduced by radio hardware of a transmitter or receiver. A radio impairment calibration may include measurement of any unintended signal component within a signal and removal of the measured, unintended signal component from the signal. The removal, or cancellation, of the unintended signal component from the signal provides a signal that is clean from impairments. The removal or cancellation of the unintended signal component may be performed by analog blocks of a signal processing system, digital blocks of the signal processing system, or a combination of both. For example, at least calibration component 1012 of apparatus 1002 may perform the calibration. The radio impairment calibration may comprise a reception calibration and/or a transmission calibration. The radio impairment calibration may include a DC offset calibration, an IQ imbalance, a timing skew calibration, a spur calibration, a loopback calibration, etc. A spur calibration may include a calibration for continuous wave spurs and/or other unmodulated spurs.

The radio impairment calibration may comprise a receiver calibration, for example. As illustrated at 910, as part of performing the calibration, the wireless device may select a gain state to be calibrated. The selection may be performed, e.g., by gain state component 1014, of apparatus 1002. The wireless device may select an untrained gain state or an older gain state having an older measurement than another gain state. By selecting a gain state having an older measurement, the wireless device may maintain more current calibration measurements.

At 912, the wireless device may perform a measurement of the DC for the selected gain state during the periodic silent period. For example, the gain state selected by the gain state component 1014 of apparatus may be applied to the reception component 1004, and the measurement may be performed by measurement component 1016. The radio impairment calibration may comprise at least one of a DC offset calibration and/or an IQ imbalance calibration. In other examples, the impairment calibration may include a loopback calibration for a transmission calibration.

At 916, the wireless device may update a DC measurement for the selected gain state. The update may be performed, e.g., by update component 1020 of the apparatus 1002. For example, the UE may maintain a DC measurement table for a plurality of possible gain states. By performing the calibration measurements during a silent period, the wireless device may update the table without interfering with communication and may obtain more accurate measurements. Additionally, by selecting untrained/less frequently trained gain states, the wireless device may help to ensure that DC measurements are accurate when a particular gain state is needed for active communication.

At 914, prior to updating the DC measurement, the wireless device may determine whether the measurement comprises a signal power above a threshold, wherein the DC measurement for the selected gain state is updated when the signal power is not above the threshold. If the signal power is above the threshold, the wireless device may discard the measurement, at 918. Otherwise, the wireless device may continue to 916, and update the DC measurement for the selected gain state. The determination may be performed, e.g., by determination component 1018 of apparatus 1002.

The wireless device may operate in a receiving state prior to the silent period, e.g., as described in connection with example 700 in FIG. 7. In another example the wireless device may operate in a transmitting state prior to the silent period, e.g., as described in connection with example 710 in FIG. 7. When the wireless device transmits during the active period, at 908, the wireless device may switch from a transmission mode to a reception mode in order to perform the radio impairment calibration, e.g., a receiver calibration, during the periodic silent period. For example, the calibration component 1012 of apparatus 1002 may perform the switch to a reception mode for the calibration.

In another example, the wireless device may perform transmission calibration during the silent period. For example, the wireless device may transmit during the active period, at 902. The transmission may be performed, e.g., by transmission component, e.g., based on instructions from calibration component 1012 of apparatus 1002. At 920, the wireless device may transmit a transmission below a transmission power level threshold during the silent period, e.g., without power amplification. By transmitting a signal below the transmission power level and without power amplification, the wireless device may observe the silent period, and may avoid interfering with the operation of other wireless devices observing the silent period.

At 922, the wireless device may use a receiver of the wireless device to measure the transmission as part of performing the radio impairment calibration. For example, the measurement may be performed by measurement component 1016 of apparatus 1002. Thus, the wireless device may use a loopback mode to perform the calibration. The radio impairment calibration may comprise a loopback calibration, for example.

Figure 10:
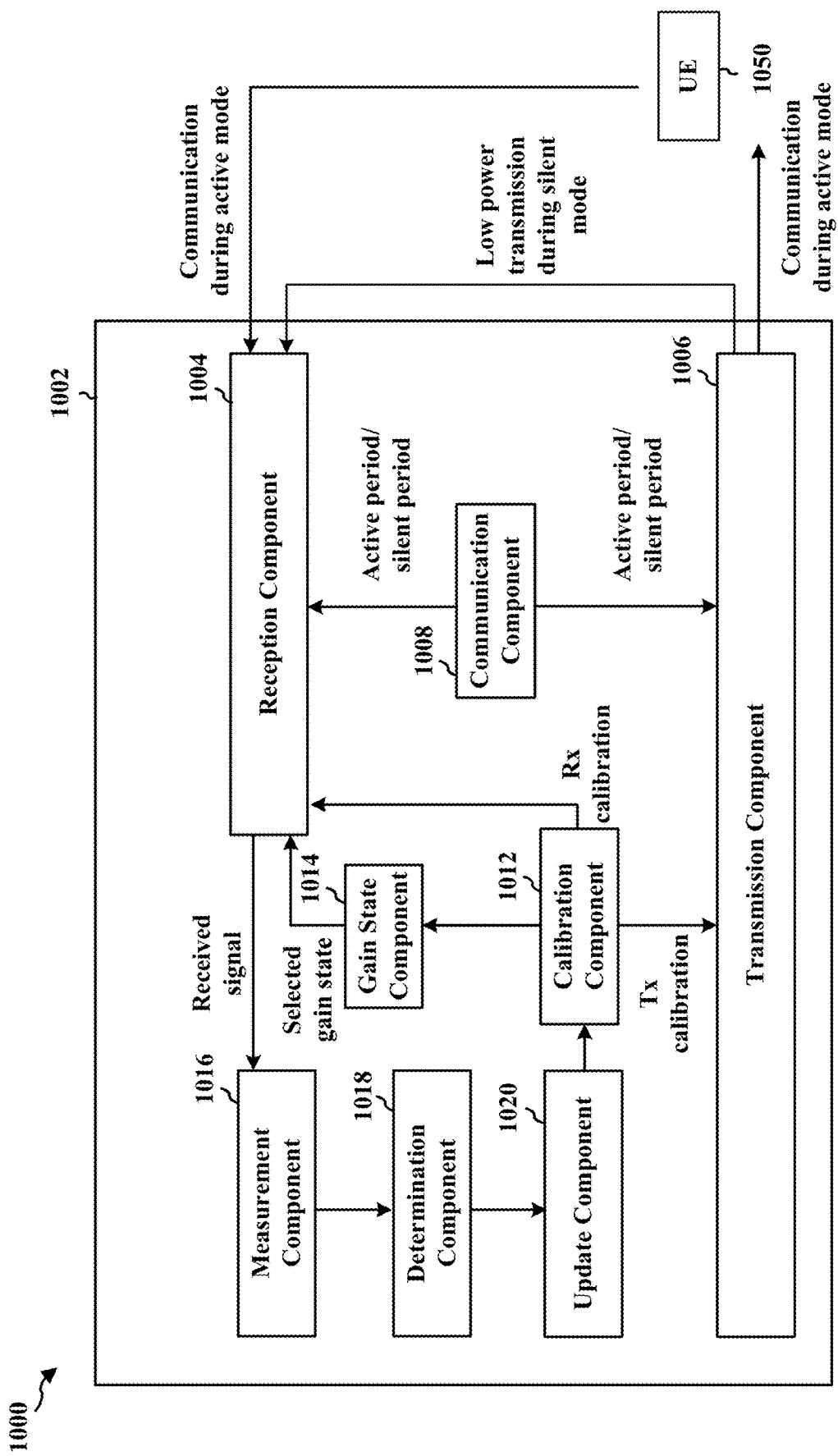
FIG. 10 is a conceptual data flow diagram illustrating the data flow between different means/components in an example apparatus.

FIG. 10 is a conceptual data flow diagram 1000 illustrating the data flow between different means/components in an example apparatus 1002. The apparatus may be a wireless device or a component of a wireless device. For example, the apparatus may comprise a UE or a component of a UE. In other examples, the apparatus may comprise an RSU or a component of an RSU. In other examples, the apparatus may comprise a wireless device communication based on V2X, V2V, or other D2D communication. The apparatus includes a reception component 1004 that receives wireless communication, e.g., directly from a wireless device 1050, and a transmission component 1006 that transmits directly to wireless device 1050. Although wireless device 1050 is illustrated as a UE, the second wireless device may comprise a RSU, etc. The apparatus may a communication component 1008 configured to communicate with wireless device 1050 during an active period. The apparatus may transmit or receive during the active period and may refrain from transmitting above a threshold power level during a silent period. The apparatus may include a calibration component 1012 configured to perform a radio impairment calibration during the periodic silent period. The apparatus may include a gain state component 1014 configured to select a gain state to be calibrated. The apparatus may include a measurement component 1016 configured to perform a measurement of the DC for the selected gain state during the periodic silent period. The apparatus may an update component 1020 configured to update a DC measurement for the selected gain state. The apparatus may include a determination component 1018 configured to determine whether the measurement comprises a signal power above a threshold, wherein the DC measurement for the selected gain state is updated, via the update component 1020, when the signal power is not above the threshold. The measurement component, determination component, and/or update component may be configured to discard the measurement when the measurement comprises the signal power above the threshold. The apparatus may transmit during the active period, and the communication component 1008 may be configured to switch from a transmission mode, e.g., using the transmission component 1006, to a reception mode, e.g., using the reception component 1004, in order to perform the radio impairment calibration during the periodic silent period. The transmission component 1006 may be configured to transmit a transmission below a transmission power level threshold during the silent period, and the measurement component 1016 may be configured to use reception component 1004 to measure the transmission as part of performing the radio impairment calibration.

The apparatus may include additional components that perform each of the blocks of the algorithm in the aforementioned flowcharts of FIGS. 8 and 9. As such, each block in the aforementioned flowcharts of FIGS. 8 and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
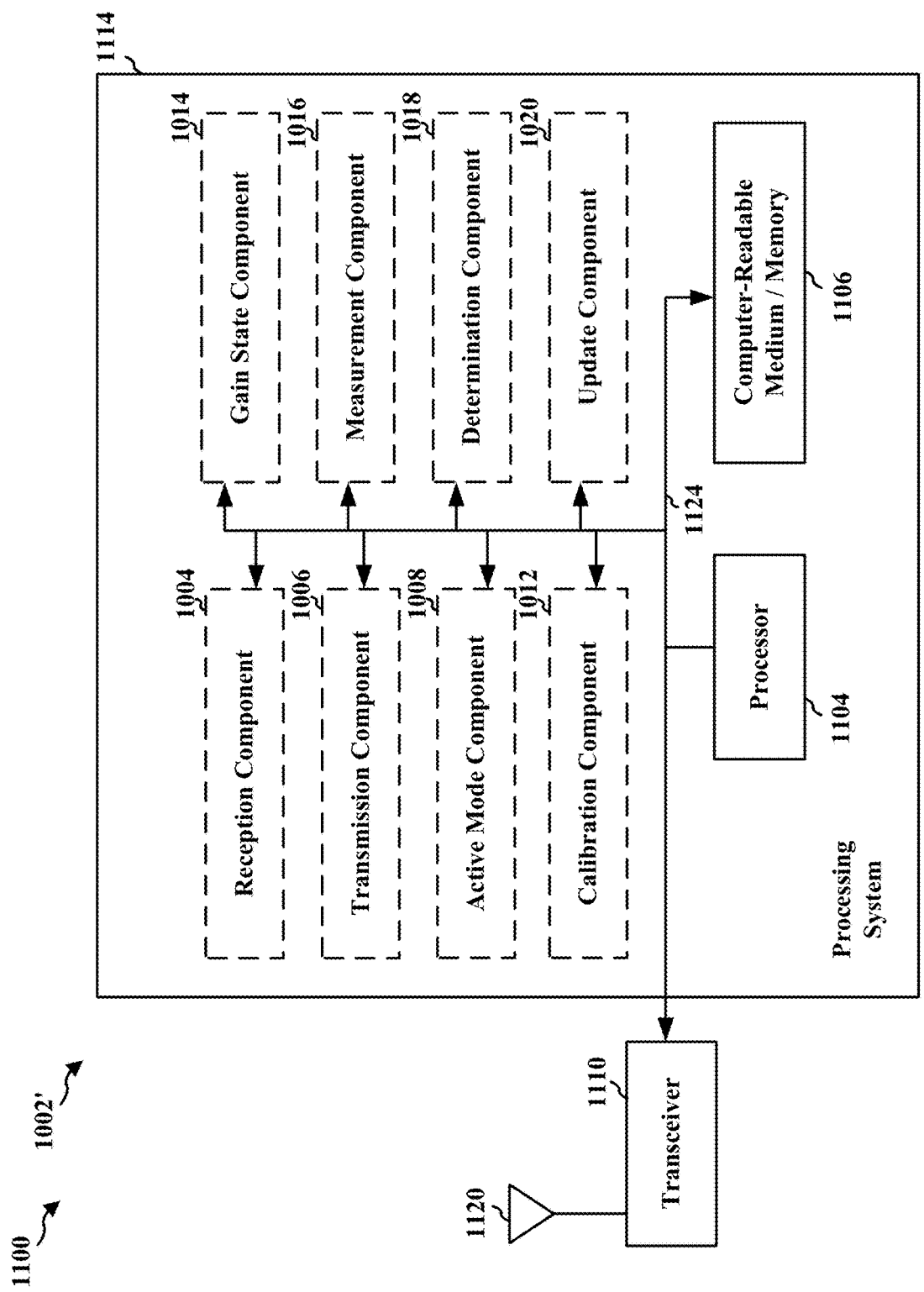
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1012, 1014, 1016, 1018, 1020, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1006, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1012, 1014, 1016, 1018, 1020. The components may be software components running in the processor 1104, resident/stored in the computer readable medium/memory 1106, one or more hardware components coupled to the processor 1104, or some combination thereof. The processing system 1114 may be a component of the device 310 or device 350 and may include the memory 376, 360 and/or at least one of the TX processor 316, 368, the RX processor 370, 356, and the controller/processor 375, 359. Alternatively, the processing system 1114 may be the entire UE (e.g., see device 310 or 350 of FIG. 3).

In one configuration, the apparatus 1002/1002' for wireless communication includes means for communicating with a second wireless device during an active period and means for performing a radio impairment calibration during a periodic silent period. The apparatus may further include means for selecting a gain state to be calibrated, means for performing a measurement of the DC for the selected gain state during the periodic silent period, and means for updating a DC measurement for the selected gain state. The apparatus may include means for determining whether the measurement comprises a signal power above a threshold, wherein the DC measurement for the selected gain state is updated when the signal power is not above the threshold; and means for discarding the measurement when the measurement comprises the signal power above the threshold. The apparatus may transmit during the active period, and may further include means for switching from a transmission mode to a reception mode in order to perform the radio impairment calibration during the periodic silent period. The apparatus may include means for transmitting a transmission below a transmission power level threshold during the silent period and means for using a receiver of the wireless device to measure the transmission as part of performing the radio impairment calibration. The aforementioned means may be one or more of the aforementioned components of the apparatus 1002 and/or the processing system 1114 of the apparatus 1002' configured to perform the functions recited by the aforementioned means. As described supra, the processing system 1114 may include the TX processor 316, 368, the RX processor 370, 356, and the controller/processor 375, 359. As such, in one configuration, the aforementioned means may be the TX processor 316, 368, the RX processor 370, 356, and the controller/processor 375, 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and aspects thereof may be combined with aspects of other examples or teaching described herein, without limitation.

Example 1 is a method of wireless communication at a first wireless device, comprising: communicating with a second wireless device during an active period; and performing a radio impairment calibration during a periodic silent period.

In Example 3, the method of Example, 1 further includes that the periodic silent period comprises at least one symbol of a subframe.

In Example 3, the method of Example 1 or Example 2 further includes that the periodic silent period comprises a last symbol of a subframe.

In Example 4, the method of Example 1 or Example 3 further includes that the first wireless device communicates with the second wireless device based on at least one of V2X, V2V, or other D2D communication.

In Example 5, the method of any of Examples 1-4 further includes that the radio impairment calibration comprises at least one of DC offset calibration or a an in-phase quadrature (IQ) imbalance calibration.

In Example 6, the method of any of Examples 1-5 further includes selecting a gain state to be calibrated; performing a measurement of the DC for the selected gain state during the periodic silent period; and updating a DC measurement for the selected gain state.

In Example 7, the method of any of Examples 1-6 further includes that the first wireless device selects an untrained gain state or an older gain state having an older measurement than another gain state.

In Example 8, the method of any of Examples 1-7 further includes determining whether the measurement comprises a signal power above a threshold, wherein the DC measurement for the selected gain state is updated when the signal power is not above the threshold; and discarding the measurement when the measurement comprises the signal power above the threshold.

In Example 9, the method of any of Examples 1-8 further includes that the first wireless device transmits during the active period, and the method further includes switching from a transmission mode to a reception mode in order to perform the radio impairment calibration during the periodic silent period.

In Example 10, the method of any of Examples 1-9 further includes that the first wireless device transmits during the active period, and the method further includes transmitting a transmission below a transmission power level threshold during the silent period; and using a receiver of the first wireless device to measure the transmission as part of performing the radio impairment calibration.

In Example 11, the method of any of Examples 1-10 further includes that the radio impairment calibration may comprise a loopback calibration.

In Example 12 is a device including one or more processors and one or more memories in electronic communication with the one or more processors storing instructions executable by the one or more processors to cause the system or apparatus to implement a method as in any of Examples 1-11.

Example 13 is a system or apparatus including means for implementing a method or realizing an apparatus as in any of Examples 1-11.

Example 14 is a non-transitory computer readable medium storing instructions executable by one or more processors to cause the one or more processors to implement a method as in any of Examples 1-11.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a first wireless device, comprising:
    transmitting or receiving sidelink communication with a second wireless device during an active period; and
    performing at least one of a direct current (DC) offset calibration or an in-phase quadrature (IQ) imbalance calibration for the sidelink communication during a periodic silent period for the sidelink communication.

2. The method of claim 1, wherein the periodic silent period comprises at least one symbol of a subframe.

3. The method of claim 1, wherein the periodic silent period comprises at least a last symbol of a subframe.

4. The method of claim 1, wherein the first wireless device communicates with the second wireless device based on at least one of vehicle-to-everything (V2X) communication, vehicle-to-vehicle (V2V), or other device-to-device (D2D) communication.

5. The method of claim 1, further comprising:
    selecting a gain state to be calibrated during the periodic silent period;
    performing a measurement of a DC for the selected gain state during the periodic silent period; and
    updating a DC measurement for the selected gain state.

6. The method of claim 5, wherein selecting the gain state to be calibrated during the periodic silent period includes selecting the gain state based on a time since a previous measurement of the gain state.

7. The method of claim 6, wherein selecting the gain state to be calibrated during the periodic silent period includes selecting a first gain state having an older measurement than a second gain state.

8. The method of claim 5, wherein selecting the gain state to be calibrated during the periodic silent period includes selecting an untrained gain state to be calibrated during the periodic silent period.

9. The method of claim 5, wherein the DC measurement for the selected gain state when a signal power is less than or equal to a threshold, the method further comprising:
    discarding the measurement when the measurement comprises the signal power above the threshold.

10. The method of claim 1, wherein the first wireless device transmits during the active period, the method further comprising:
    switching from a transmission mode to a reception mode prior to performing the at least one of the DC offset calibration or the IQ imbalance calibration during the periodic silent period.

11. The method of claim 1, wherein the first wireless device transmits during the active period, the method further comprising:
    transmitting a transmission below a transmission power level threshold during the periodic silent period; and
    using a receiver of the first wireless device to measure the transmission as part of performing the at least one of the DC offset calibration or the IQ imbalance calibration.

12. The method of claim 1, wherein the at least one of the DC offset calibration or the IQ imbalance calibration comprises a loopback calibration.

13. The method of claim 1, wherein the first wireless device is a first UE, and the second wireless device is a second UE.

14. The method of claim 1, further comprising:
    transmitting or receiving the sidelink communication after the periodic silent period based on the at least one of the DC offset calibration or the IQ imbalance calibration performed during the periodic silent period.

15. An apparatus for wireless communication at a first wireless device, comprising:
    a memory; and
    at least one processor coupled to the memory and configured to:
        transmit or receive sidelink communication with a second wireless device during an active period; and
        perform at least one of a direct current (DC) offset calibration or an in-phase quadrature (IQ) imbalance calibration for the sidelink communication during a periodic silent period for the sidelink communication.

16. The apparatus of claim 15, wherein the periodic silent period comprises at least one symbol of a subframe.

17. The apparatus of claim 15, wherein the periodic silent period comprises a las symbol of a subframe.

18. The apparatus of claim 15, wherein the first wireless device communicates with the second wireless device based on at least one of vehicle-to-everything (V2X) communication, vehicle-to-vehicle (V2V), or other device-to-device (D2D) communication.

19. The apparatus of claim 15, wherein the at least one processor is further configured to:
    select a gain state to be calibrated during the periodic silent period;
    perform a measurement of a DC for the selected gain state during the periodic silent period; and
    update a DC measurement for the selected gain state.

20. The apparatus of claim 19, wherein to select the gain state to be calibrated during the periodic silent period, the at least one processor is configured to select an untrained gain state or an older gain state having an older measurement than another gain state.

21. The apparatus of claim 19, wherein the at least one processor is further configured to:
    update the DC measurement for the selected gain state when a signal power is less than or equal to a threshold; and discard the measurement when the measurement comprises the signal power above the threshold.

22. The apparatus of claim 15, wherein the at least one processor is further configured to:
switch from a transmission mode for the active period to a reception mode in order to perform the at least one of the DC offset calibration or the IQ imbalance calibration during the periodic silent period.

23. The apparatus of claim 15, wherein the at least one processor is further configured to:
transmit a transmission below a transmission power level threshold during the periodic silent period; and
use a receiver of the first wireless device to measure the transmission as part of performing the at least one of the DC offset calibration or the IQ imbalance calibration.

24. The apparatus of claim 15, wherein the at least one of the DC offset calibration or the IQ imbalance calibration comprises a loopback calibration.

25. An apparatus for wireless communication at a first wireless device, comprising:
means for transmitting or receiving sidelink communication with a second wireless device during an active period; and
means for performing at least one of a direct current (DC) offset calibration or an in-phase quadrature (IQ) imbalance calibration for the sidelink communication during a periodic silent period for the sidelink communication.

26. The apparatus of claim 25, wherein the periodic silent period comprises a last symbol of a subframe.

27. The apparatus of claim 25, further comprising:
means for selecting a gain state to be calibrated during the periodic silent period, the gain state being an untrained gain state or an older gain state having an older measurement than another gain state;
means for performing a measurement of a DC for the selected gain state during the periodic silent period; and
means for updating a DC measurement for the selected gain state.

28. The apparatus of claim 27, wherein the means for updating the DC measurement are configured to update the DC measurement for the selected gain state when a signal power is less than or equal to a threshold, the apparatus further comprising:
means for discarding the measurement when the measurement comprises the signal power above the threshold.

29. The apparatus of claim 25, further comprising:
means for switching from a transmission mode for the active period to a reception mode in order to perform the at least one of the DC offset calibration or the IQ imbalance calibration during the periodic silent period.

30. The apparatus of claim 25, further comprising:
means for transmitting a transmission below a transmission power level threshold during the periodic silent period; and
means for using a receiver of the first wireless device to measure the transmission as part of performing the at least one of the DC offset calibration or the IQ imbalance calibration.

31. A non-transitory computer-readable medium storing computer executable code for wireless communication at a first wireless device, the code when executed by a processor cause the processor to:
transmit or receive sidelink communication with a second wireless device during an active period; and
perform at least one of a direct current (DC) offset calibration or an in-phase quadrature (IQ) imbalance calibration for the sidelink communication during a periodic silent period for the sidelink communication.

32. The method of claim 1, wherein the transmitting or receiving the sidelink communication with the second wireless device during the active period includes transmitting the sidelink communication with the second wireless device during the active period.

33. The method of claim 1, wherein the transmitting or receiving the sidelink communication with the second wireless device during the active period includes receiving the sidelink communication with the second wireless device during the active period.

34. The method of claim 1, wherein the first wireless device performs the DC offset calibration for the sidelink communication during the periodic silent period for the sidelink communication.

35. The method of claim 1, wherein the first wireless device performs the IQ imbalance calibration for the sidelink communication during the periodic silent period for the sidelink communication.

36. The method of claim 10, wherein the first wireless device switches from the transmission mode to the reception mode prior to performing the DC offset calibration during the periodic silent period.

37. The method of claim 10, wherein the first wireless device switches from the transmission mode to the reception mode prior to performing the IQ imbalance calibration during the periodic silent period.

38. The method of claim 11, wherein the first wireless device uses the receiver of the first wireless device to measure the transmission as part of performing the DC offset calibration the IQ imbalance calibration.

39. The method of claim 11, wherein the first wireless device uses the receiver of the first wireless device to measure the transmission as part of performing the IQ imbalance calibration.

40. The method of claim 12, wherein the DC offset calibration comprises the loopback calibration.

41. The method of claim 12, wherein the IQ imbalance calibration comprises the loopback calibration.

42. The method of claim 1, wherein the first wireless device is a first UE, and the second wireless device is a second UE.

43. The apparatus of claim 15, wherein the at least one processor is further configured to:
transmit or receive the sidelink communication after the periodic silent period based on the at least one of the DC offset calibration or the IQ imbalance calibration performed during the periodic silent period.

44. The apparatus of claim 19, wherein to select the gain state to be calibrated during the periodic silent period, the at least one processor is configured to select the gain state based on a time since a previous measurement of the gain state.

45. The apparatus of claim 44, wherein to select the gain state to be calibrated during the periodic silent period, the at least one processor is configured to select a first gain state having an older measurement than a second gain state.

46. The apparatus of claim 15, wherein the at least one processor is configured to transmit the sidelink communication with the second wireless device during the active period.

47. The apparatus of claim 15, wherein the at least one processor is configured to receive the sidelink communication with the second wireless device during the active period.

48. The apparatus of claim 15, wherein the at least one processor is configured to perform the DC offset calibration for the sidelink communication during the periodic silent period for the sidelink communication.

49. The apparatus of claim 15, wherein the at least one processor is configured to perform the IQ imbalance calibration for the sidelink communication during the periodic silent period for the sidelink communication.

50. The apparatus of claim 22, wherein the the at least one processor is configured to switch from the transmission mode to the reception mode prior to the DC offset calibration during the periodic silent period.

51. The apparatus of claim 22, wherein the at least one processor is configured to switch from the transmission mode to the reception mode prior to the IQ imbalance calibration during the periodic silent period.

52. The apparatus of claim 23, wherein the at least one processor is further configured to use the receiver of the first wireless device to measure the transmission as part of performing the DC offset calibration the IQ imbalance calibration.

53. The apparatus of claim 23, wherein the at least one processor is configured to use the receiver of the first wireless device to measure the transmission as part of performing the IQ imbalance calibration.

54. The apparatus of claim 24, wherein the DC offset calibration comprises the loopback calibration.

55. The apparatus of claim 24, wherein the IQ imbalance calibration comprises the loopback calibration.

56. The apparatus of claim 15, further comprising:
at least one antenna coupled to the at least one processor.

57. The apparatus of claim 25, wherein the means for transmitting or receiving the sidelink communication with the second wireless device during the active period are configured to transmit the sidelink communication with the second wireless device during the active period.

58. The apparatus of claim 25, wherein the means for transmitting or receiving the sidelink communication with the second wireless device during the active period are configured to receive the sidelink communication with the second wireless device during the active period.

59. The apparatus of claim 25, wherein the means for performing are configured to perform the DC offset calibration for the sidelink communication during the periodic silent period for the sidelink communication.

60. The apparatus of claim 25, wherein the means for performing are configured to perform the IQ imbalance calibration for the sidelink communication during the periodic silent period for the sidelink communication.

61. The non-transitory computer-readable medium of claim 31, wherein the code, when executed by the processor, further causes the processor to:
select a gain state to be calibrated during the periodic silent period;
perform a measurement of a DC for the selected gain state during the periodic silent period; and
update a DC measurement for the selected gain state.

62. The non-transitory computer-readable medium of claim 61, wherein selecting the gain state to be calibrated during the periodic silent period includes selecting an untrained gain state to be calibrated during the periodic silent period.

63. The non-transitory computer-readable medium of claim 61, wherein the code, when executed by the processor causes the processor to:
transmit the sidelink communication with the second wireless device during the active period.

64. The non-transitory computer-readable medium of claim 61, wherein the code, when executed by the processor causes the processor to:
receive the sidelink communication with the second wireless device during the active period.

65. The non-transitory computer-readable medium of claim 61, wherein the code, when executed by the processor causes the processor to:
perform the DC offset calibration for the sidelink communication during the periodic silent period for the sidelink communication.

66. The non-transitory computer-readable medium of claim 61, wherein the code, when executed by the processor causes the processor to:
perform the IQ imbalance calibration for the sidelink communication during the periodic silent period for the sidelink communication.

\* \* \* \* \*